United States Patent
Martin et al.

(10) Patent No.: US 11,623,857 B2
(45) Date of Patent: *Apr. 11, 2023

(54) FUEL FILL CONTROL SYSTEMS AND METHODS FOR ANTICIPATING VEHICLE REFUELING EVENTS

(71) Applicant: FORD GLOBAL TECHNOLOGIES, LLC, Dearborn, MI (US)

(72) Inventors: David Martin, Dearborn, MI (US); Brent Edward Sealy, Canton, MI (US); Roshini Venkatesh, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,601

(22) Filed: Aug. 25, 2021

(65) Prior Publication Data

US 2021/0380397 A1 Dec. 9, 2021

Related U.S. Application Data

(62) Division of application No. 16/574,454, filed on Sep. 18, 2019, now Pat. No. 11,124,408.

(51) Int. Cl.
*B67D 7/08* (2010.01)
*B60K 15/035* (2006.01)
*B60W 40/02* (2006.01)
*B67D 7/04* (2010.01)
*B60K 15/03* (2006.01)

(52) U.S. Cl.
CPC .............. *B67D 7/08* (2013.01); *B60K 15/035* (2013.01); *B60W 40/02* (2013.01); *B67D 7/04* (2013.01); *B60K 2015/03019* (2013.01); *B60K 2015/0323* (2013.01); *B60K 2015/03296* (2013.01); *B60K 2015/03595* (2013.01); *B60W 2556/50* (2020.02); *B60W 2710/0616* (2013.01)

(58) Field of Classification Search
CPC .......... B67D 7/08; B67D 7/04; B60K 15/035; B60K 2015/03019; B60K 2015/0323; B60K 2015/03296; B60K 2015/03595; B60W 40/02; B60W 2556/50; B60W 2710/0616
See application file for complete search history.

(56) References Cited

U.S. PATENT DOCUMENTS

| | | |
|---|---|---|
| 9,644,552 B2 | 5/2017 | Dudar |
| 9,881,432 B2 | 1/2018 | McQuade et al. |
| 10,060,379 B2 | 8/2018 | Dudar |

(Continued)

*Primary Examiner* — Timothy P. Kelly
*Assistant Examiner* — Christopher M Afful
(74) *Attorney, Agent, or Firm* — David B. Kelley; Carlson, Gaskey & Olds, P.C.

(57) ABSTRACT

Vehicle fuel fill control systems may anticipate vehicle refueling events in order to control the timing of fuel tank depressurization sequences. In a first embodiment, a global positioning system (GPS) is utilized to anticipate the vehicle refueling event prior to initializing the depressurization sequence. In another embodiment, a camera system is utilized to anticipate the refueling event prior to initializing the depressurization sequence. In yet another embodiment, both the GPS and the camera system may be utilized to anticipate the refueling event. By anticipating refueling events, customer wait time for gaining refueling access may be reduced.

17 Claims, 5 Drawing Sheets

(56) References Cited

U.S. PATENT DOCUMENTS

| | | |
|---|---|---|
| 10,696,537 B2 | 6/2020 | Ghannam et al. |
| 2018/0072556 A1 | 3/2018 | Dudar et al. |
| 2019/0061779 A1 | 2/2019 | Mohan et al. |
| 2019/0186422 A1 | 6/2019 | Dudar et al. |
| 2019/0352171 A1* | 11/2019 | Ghannam ................ B67D 7/42 |

* cited by examiner

FUEL FILL CONTROL SYSTEMS AND METHODS FOR ANTICIPATING VEHICLE REFUELING EVENTS

CROSS REFERENCE TO RELATED APPLICATIONS

This is a divisional of U.S. patent application Ser. No. 16/574,454, filed on Sep. 18, 2019, the entire disclosure of which is hereby incorporated by reference.

TECHNICAL FIELD

This disclosure relates to vehicle fuel systems, and more particularly to fuel fill control systems and associated methods for anticipating vehicle refueling events.

BACKGROUND

Many automotive vehicles include fuel systems. A fuel door assembly of the fuel systems provides access to a fuel inlet conduit for refueling the vehicle.

SUMMARY

A fuel fill control system for a vehicle according to an exemplary aspect of the present disclosure includes, among other things, a fuel tank, a global positioning system configured to identify a nearby fuel station, a sensor system configured to detect when the vehicle is in park, and a controller configured to initialize a depressurization sequence of the fuel tank in response to receiving a first input signal from the global positioning system and a second input signal from the sensor system. The first input signal and the second input signal indicate that a vehicle refueling event is likely.

In a further non-limiting embodiment of the foregoing fuel fill control system, the global positioning system includes a road database that includes geographic coordinates of the nearby fuel station.

In a further non-limiting embodiment of either of the foregoing fuel fill control systems, the first input signal indicates that the vehicle is within a predefined distance from the nearby fuel station.

In a further non-limiting embodiment of any of the foregoing fuel fill control systems, the second input signal indicates that a shift device of the vehicle is positioned in a park position.

In a further non-limiting embodiment of any of the foregoing fuel fill control systems, a camera system is configured to capture an image of a fuel pump of the nearby fuel station.

In a further non-limiting embodiment of any of the foregoing fuel fill control systems, a fuel door is movable to fluidly access the fuel tank, and a door biasing assembly is configured to control movement of the fuel door.

In a further non-limiting embodiment of any of the foregoing fuel fill control systems, the door biasing assembly includes an actuator configured to hold the fuel door closed during the depressurization sequence of the fuel tank.

In a further non-limiting embodiment of any of the foregoing fuel fill control systems, the actuator is a solenoid.

In a further non-limiting embodiment of any of the foregoing fuel fill control systems, a piston of the solenoid is controllable by the controller to either lock or unlock the fuel door.

In a further non-limiting embodiment of any of the foregoing fuel fill control systems, the fuel fill control system is part of a Non-Integrated Refueling Canister Only System (NIRCOS) of the vehicle.

A fuel fill control system for a vehicle according to another exemplary aspect of the present disclosure includes, among other things, a fuel tank, a camera system configured to capture an image of a fuel pump of a fuel station, and a controller configured to initialize a depressurization sequence of the fuel tank in response to receiving a first input signal from the camera system. The first input signal indicates that a vehicle refueling event is likely.

In a further non-limiting embodiment of the foregoing fuel fill control system, the first input signal indicates that the camera system has detected the fuel pump by capturing the image.

In a further non-limiting embodiment of either of the foregoing fuel fill control systems, the camera system includes a plurality of cameras that are adapted to capture a near 360 degree view of an environment surrounding the vehicle.

In a further non-limiting embodiment of any of the foregoing fuel fill control systems, a global positioning system is configured to identify the fuel station.

In a further non-limiting embodiment of any of the foregoing fuel fill control systems, the controller is configured to command the depressurization sequence of the fuel tank to begin in response to receiving the first input signal from the camera system and a second input signal from the global positioning system.

In a further non-limiting embodiment of any of the foregoing fuel fill control systems, the second input signal indicates that the vehicle is within a predefined distance from the fuel station.

In a further non-limiting embodiment of any of the foregoing fuel fill control systems, a fuel door is movable to fluidly access the fuel tank, and a door biasing assembly is configured to control movement of the fuel door.

In a further non-limiting embodiment of any of the foregoing fuel fill control systems, the door biasing assembly includes an actuator configured to hold the fuel door closed during the depressurization sequence of the fuel tank.

In a further non-limiting embodiment of any of the foregoing fuel fill control systems, the actuator is a solenoid.

In a further non-limiting embodiment of any of the foregoing fuel fill control systems, the fuel fill control system is part of a Non-Integrated Refueling Canister Only System (NIRCOS) of the vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to vehicle fuel fill control systems for anticipating vehicle refueling events in order to control the timing of fuel tank depressurization sequences (e.g., by advancing the timing to occur sooner). In a first embodiment, a global positioning system (GPS) is utilized to anticipate the vehicle refueling event prior to initializing the depressurization sequence. In another embodiment, a camera system is utilized to anticipate the refueling event prior to initializing the depressurization sequence. In yet another embodiment, both the GPS and the camera system may be utilized to anticipate the refueling event. By anticipating refueling events, customer wait time for gaining refueling access may be reduced. These and other features of this disclosure are described in greater detail below.

Figure 1:
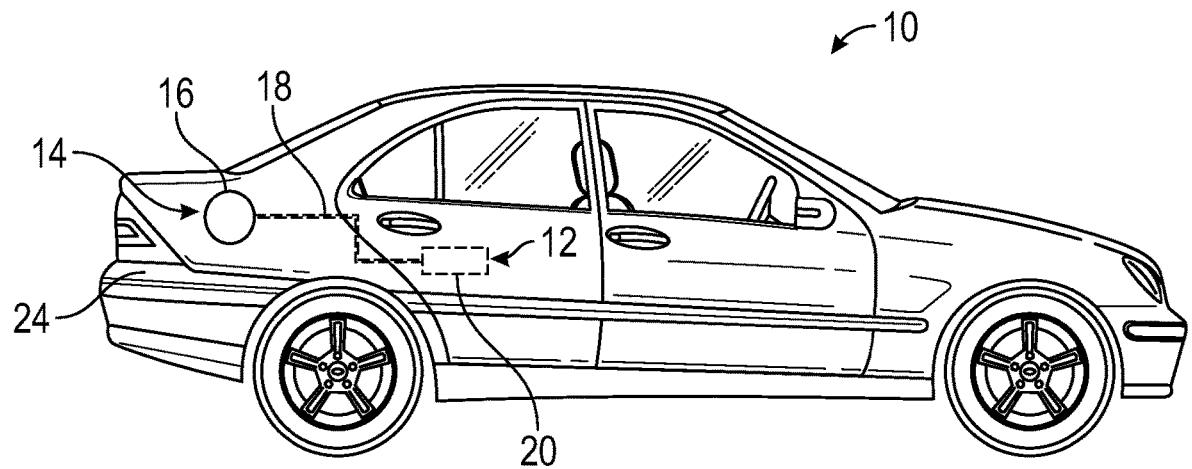
FIG. 1 schematically illustrates a vehicle equipped with a fuel system.
Figure 2:
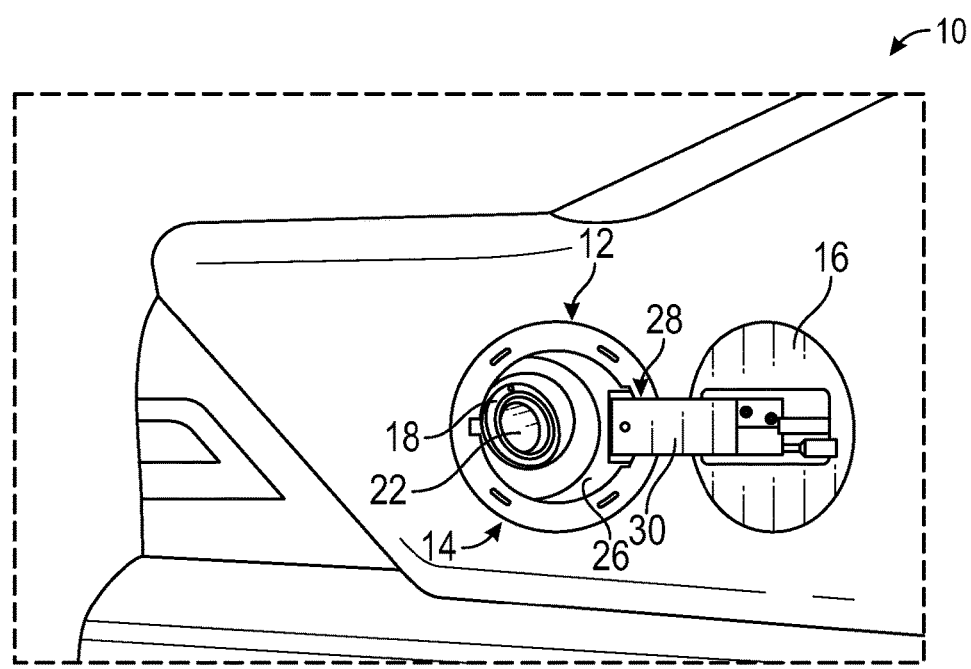
FIG. 2 illustrates a fuel door assembly of the fuel system of the vehicle of FIG. 1.

FIGS. 1 and 2 schematically illustrate a vehicle 10. The vehicle 10 could be a car, a truck, a van, a sport utility vehicle, or any other type of vehicle. The vehicle 10 could also be a conventional, internal combustion engine powered vehicle, a traction battery powered hybrid electric vehicle (HEV), a plug-in hybrid electric vehicle (PHEV), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a fuel system 12. The fuel system 12 may include, among various other components, a fuel door assembly 14 having a fuel door 16, a fuel inlet conduit 18, and a fuel tank 20. The fuel inlet conduit 18 includes an inlet opening 22. The fuel inlet conduit 18 may extend from the inlet opening 22 to an internal control valve (not shown) attached to or positioned within the fuel tank 20 in order to fluidly access the fuel tank 20 when the fuel door 16 is opened.

The fuel door 16 is shown in a closed position in FIG. 1 and is shown in an open position in FIG. 2. When the fuel door 16 is rotated to the closed position, the fuel door 16 is substantially flush to a vehicle body component, such as a rear side panel 24 of the vehicle 10, for example.

The fuel door assembly 14 may include a housing 26 that circumferentially surrounds the inlet opening 22 of the fuel inlet conduit 18. The housing 26 may extend from the fuel inlet conduit 18 to the rear side panel 24 to cover a gap between the fuel inlet conduit 18 and the vehicle body.

The fuel door assembly 14 may additionally include a hinge assembly 28 having a hinge arm 30. The hinge assembly 28 may be connected to both the fuel door 16 and the housing 26 to control movement of the fuel door 16 between the open and closed positions relative to the housing 26.

The fuel system 12 may be a capless fuel system, which, for purposes of this disclosure, means that no separate cap is removably secured relative to the fuel inlet conduit 18 to seal and cover the inlet opening 22.

To refuel the fuel tank 20, a fuel dispensing nozzle of a fuel pump (not shown) may be inserted through the inlet opening 22 of the fuel inlet conduit 18. Fuel can then be delivered from a fuel supply, through the fuel dispensing nozzle, into the fuel inlet conduit 18, and ultimately into the fuel tank 20 during vehicle refueling events.

In an embodiment, the fuel system 12 is designed to retain fuel vapors to meet evaporative emissions requirements. The fuel system 12 may be a Non-Integrated Refueling Canister Only System (NIRCOS). As a result, the fuel system 12 can achieve vapor pressures and vacuum levels higher than conventional fuel systems. However, the teachings of this disclosure are not limited to NIRCOS fuel systems and could apply to any fuel system for any vehicle.

The fuel system 12 can incorporate a pressure management system that ensures that a pressure within the fuel tank 20 is maintained within a particular threshold range. Adjusting the pressure within the fuel tank 20 may be required prior to refueling the fuel tank 20. For example, if the pressure is too high, reducing the pressure may be needed prior to refueling to lessen the potential for fuel vapors escaping from the fuel system 12 through the inlet opening 22. Alternatively, if the pressure is too low, increasing the pressure may be required prior to refueling to lessen the potential for a vacuum drawing contaminants into the fuel system 12 through the inlet opening 22. In an embodiment, adjusting the pressure within the fuel tank 20 can require anywhere from approximately three to fifteen seconds. After the pressure is appropriately adjusted, the user can begin to refuel the fuel tank 20. The process of adjusting the pressure within the fuel tank 20 to be within a particular threshold range may be referred to within this disclosure as a fuel tank depressurization sequence, or simply depressurization sequence.

In many fuel systems, the fuel tank depressurization sequence is typically initiated when a user has pushed a fuel door opening button located inside a passenger cabin, or elsewhere on the vehicle 10, or otherwise has physically indicated a desire to begin refueling. Depending on how long it takes for the user to walk to the fuel door 16 after pressing the fuel door opening button, the user may be forced to stand outside the vehicle 10 and wait for the fuel tank depressurization sequence to complete before opening the fuel door 16 and beginning the refueling. Accordingly, fuel fill control systems that provide improved control over the timing of the fuel tank depressurization sequence in order to reduce customer wait time for gaining refueling access are proposed within this disclosure.

Figure 3:
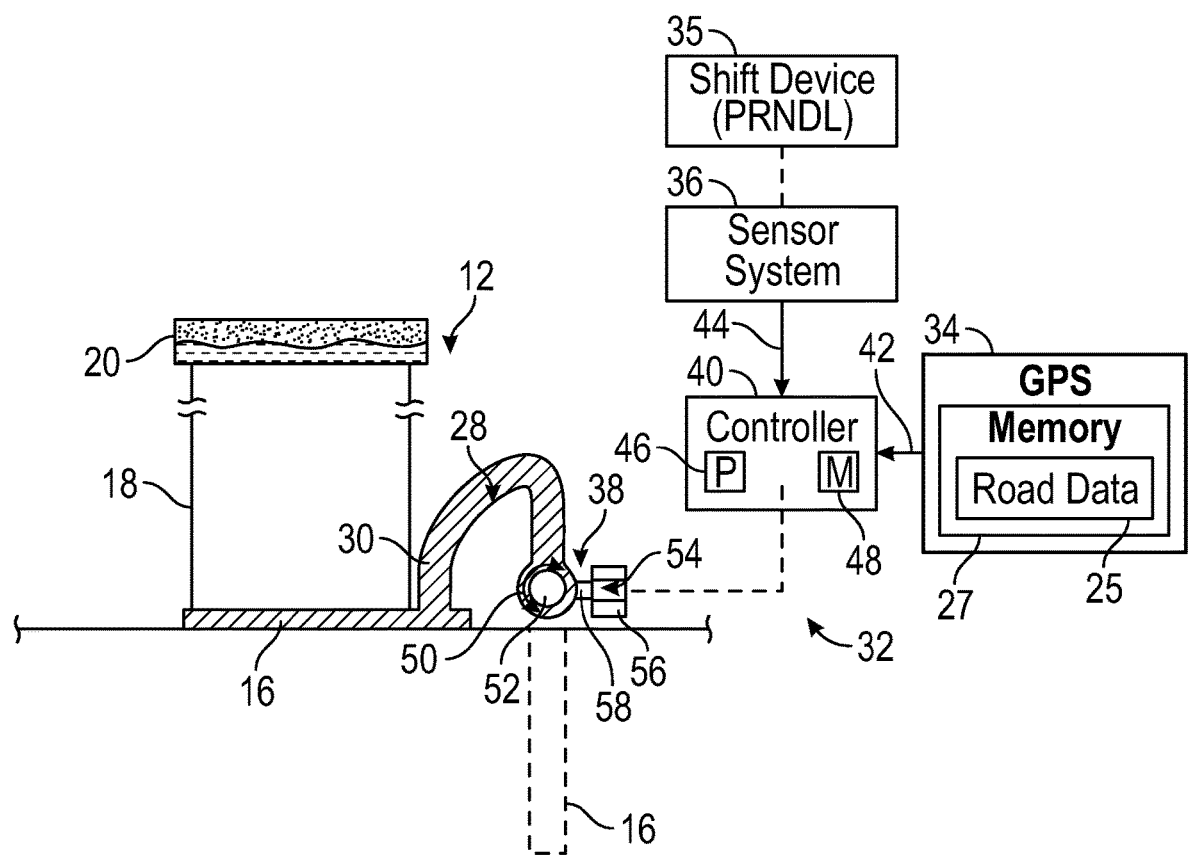
FIG. 3 illustrates a fuel fill control system according to an embodiment of this disclosure.

An exemplary fuel fill control system 32 for use with the fuel system 12 of FIGS. 1-2 is schematically illustrated in FIG. 3. The fuel fill control system 32 may be employed to initiate the fuel tank depressurization sequence of the fuel system 12 without requiring any specific prompt from the user (e.g., pressing a fuel door opening button, etc.) Advancing the timing of the fuel tank depressurization sequence to occur earlier is desired in order to reduce user wait times for gaining access to the inlet opening 22 of the fuel inlet conduit 18 for refueling.

The fuel fill control system 32 may include a global positioning system (GPS) 34, a sensor system 36, a door biasing assembly 38, and a controller 40. These systems and components of the fuel fill control system 32 are described in detail below.

The GPS 34 may be part of an on-board navigation system of the vehicle 10. Using satellite navigation, the GPS 34 can pinpoint a location of the vehicle 10 and correlate the position to a road database 25 that is stored in a memory device 27 (e.g., solid state read-only memory (ROM), optical media, flash memory, magnetic media, or any combination of these) of the GPS 34. The road database 25 may include a vector map that includes street names, street numbers, and waypoints (e.g., points of interest such as fuel stations, restaurants, etc.) that are encoded as geographic coordinates within the vector map.

In an embodiment, the GPS 34 is configured to anticipate a refueling event of the vehicle 10. For example, the GPS 34 may identify fuel stations that are located nearby the vehicle 10 by referencing the road database 25. The GPS 34 may periodically communicate a first input signal 42 to the controller 40, such as when the vehicle 10 is within a predefined distance from an identified fuel station, for example.

The sensor system 36 may include one or more sensors adapted for sensing various vehicle conditions. In an embodiment, the sensor system 36 may sense a current positioning of a shift device 35 of the vehicle 10. The shift device 35 may be located within a passenger compartment of the vehicle 10 and is generally used to change a gear of a transmission of the vehicle 10. For example, the shift device 35 may be used to shift the transmission into park (P), reverse (R), neutral (N), drive (D), low (L), etc. The shift device 35 could be a shift lever movable to change the gear or an electronic shift device that includes one or more joysticks, dials, and/or buttons for changing the gear. In an embodiment, the sensor system 36 communicates a second input signal 44 to the controller 40 in response to the shift device 35 being moved into park (P) (i.e., when the transmission is moved out of a drive gear and into the park (P) position).

The door biasing assembly 38 may include a hinge spring 50, a pivot pin 52, and an actuator 54. The hinge spring 50 may be received over or about the pivot pin 52, which along with the hinge arm 30 is part of the hinge assembly 28 of the fuel door assembly 14. The pivot pin 52 is operably connected to the hinge arm 30 and is configured to guide movement of the fuel door 16 between a closed position and an open position (show in phantom in FIG. 3).

The actuator 54 may be selectively controlled by the controller 40 to temporarily lock the positioning of the fuel door 16 (i.e., hold the fuel door 16 in either the closed position or the open position). In an embodiment, the actuator 54 is a solenoid that includes a body 56 and a piston 58. The actuator 54 may be energized, such as in response to a command signal from the controller 40, to move the piston 58 relative to the body 56.

Figure 4A:
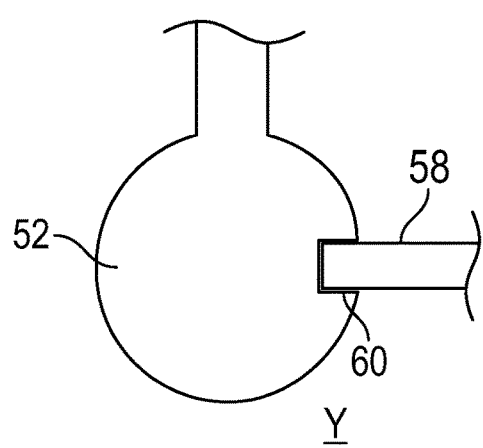
FIGS. 4A and 4B schematically illustrate the operation of an actuator of the fuel fill control system of FIG. 3.
Figure 4B:
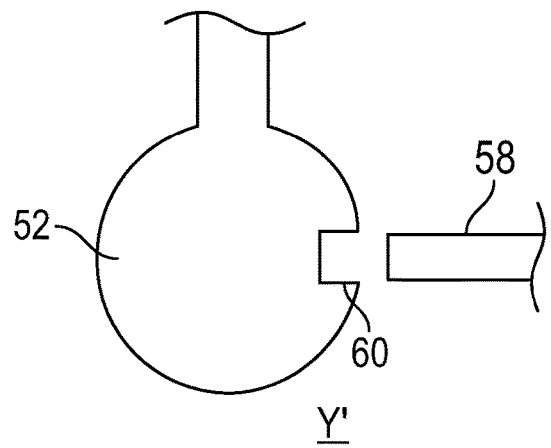

The piston 58 may be moved to a first position Y (see FIG. 4A) in which it is received within a detent 60 of the pivot pin 52 to lock a positioning of the fuel door 16. Although shown with respect to the pivot pin 52, the detent 60 could be positioned at other locations of the fuel door assembly. The fuel door 16 cannot be pivoted about the pivot pin 52 when the piston 58 is positioned within the detent 60. The piston 58 may be also be moved to a second position Y' (see FIG. 4B) in which it is removed from the detent 60 to unlock the positioning of the fuel door 16. The fuel door 16 may be pivoted about the pivot pin 52 when the piston 58 is removed from the detent 60.

In an embodiment, the piston 58 may be moved to the first position Y to lock the positioning of the fuel door 16 while the fuel tank 20 is pressurizing/depressurizing. In another embodiment, the piston 58 may be moved to the first position Y to lock the positioning of the fuel door 16 while the user is refueling the vehicle 10. The piston 58 may therefore prevent the fuel door 16 from being blown shut by wind forces that act on the fuel door 16 while the fuel door 16 is in the open position and the vehicle 10 is stationary.

The GPS 34 and the sensor system 36 may be in electrical communication with the controller 40 for determining when to initialize a depressurization sequence of the fuel tank 20. The controller 40 may be part of an overall vehicle control system or could be a separate controller that communicates with the vehicle control system. The controller 40 may be equipped with the necessary hardware and software for interfacing with and commanding operation of various components of the fuel system 12.

In an embodiment, the controller 40 includes a processing unit 46 and non-transitory memory 48 for executing the various control strategies and operations of the fuel fill control system 32. The processing unit 46, in an embodiment, is configured to execute one or more programs stored in the memory 48 of the controller 40. A first exemplary program, when executed, may be employed to initiate the fuel tank depressurization sequence in response to receiving the first input signal 42 from the GPS 34 and the second input signal 44 from the sensor system 36. The first and second input signals 42, 44 therefore provide inputs to the controller 40 for inferring or anticipating that the user desires to refuel the vehicle 10. Anticipating the refueling event in this manner can reduce user refueling wait times and eliminate the need for setting a check engine light error in situations where the user inadvertently leaves the fuel door 16 open after a prior refueling.

In response to receiving the first and second input signals 42, 44, the controller 40 can automatically initiate the fuel tank depressurization sequence to bring the pressure of the fuel tank 20 within a range that is acceptable for refueling. By advancing the initiation of the depressurization sequence in this manner and without awaiting a user prompt, refueling wait times may be reduced.

A second exemplary program, when executed by the controller 40, may be employed to hold the fuel door 16 closed during the fuel tank depressurization sequence. For example, in response to receiving the first and second input signals 42, 44, which as stated above may be used to infer that a refueling event is likely, the controller 40 may command the actuator 54 to the first position Y (see FIG. 4A), thereby locking the positioning of the fuel door 16 during the fuel tank depressurization sequence.

A third exemplary program, when executed by the controller 40, may be employed to unlock the fuel door 16 after bringing the pressure of the fuel tank 20 within a predefined pressure range. For example, the controller 40 may command the actuator 54 to the second position Y' (see FIG. 4B) once the pressure of the fuel tank 20 is within the predefined pressure range, thereby allowing the user to open the fuel door 16 and begin refueling.

Figure 5:
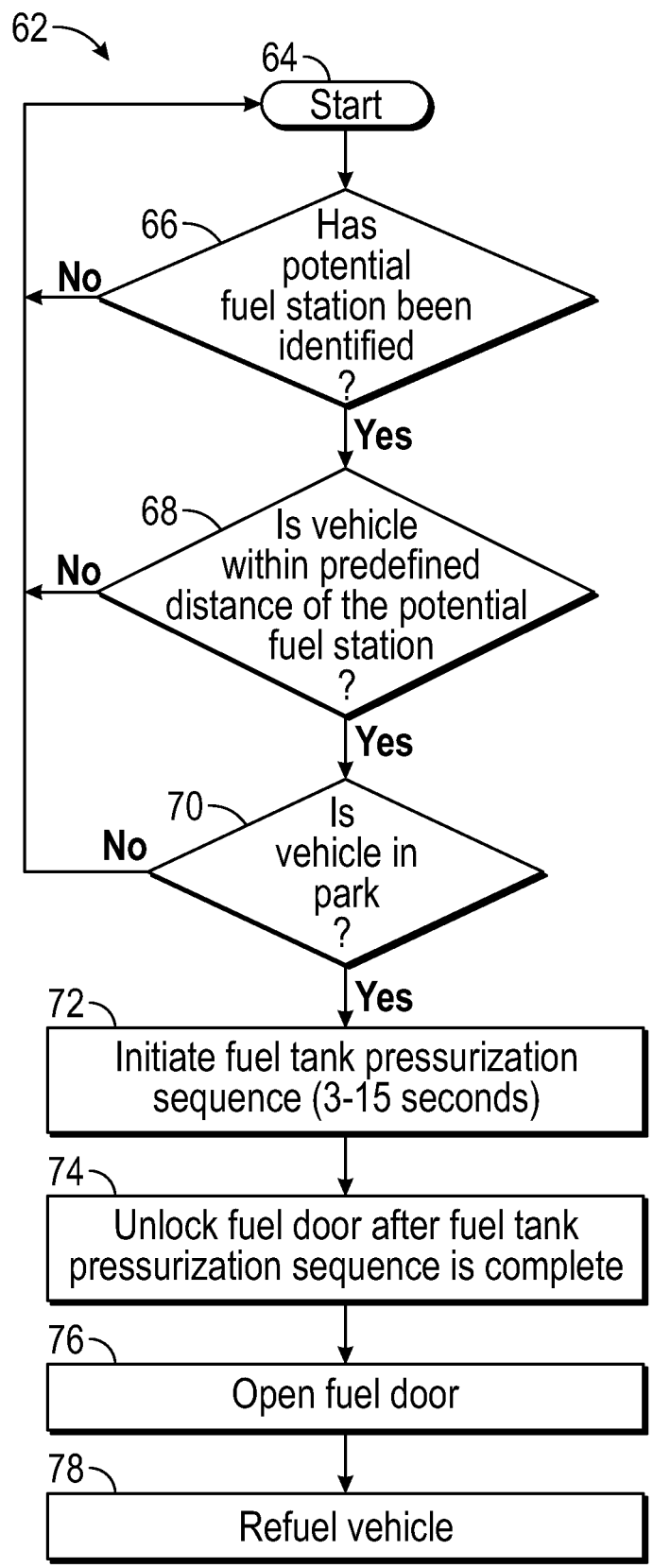
FIG. 5 schematically illustrates an exemplary fuel fill control method.

An exemplary fuel fill control method 62 is schematically illustrated in FIG. 5. The fuel fill control method 62 may be a control strategy that is executed in order to anticipate a likely refueling event of the vehicle 10 and automatically advance the start time of the fuel tank depressurization sequence in response thereto. For example, the fuel fill control method 62 may be performed by the fuel fill control system 32 in order to initiate the fuel tank depressurization sequence of the fuel system 12 without requiring any specific user prompt, thereby reducing user wait times for gaining access to the inlet opening 22 of the fuel inlet conduit 18 for refueling.

In an embodiment, the controller 40 is programmed with one or more algorithms adapted to execute the exemplary fuel fill control method 62. In another embodiment, the fuel fill control method 62 is stored as executable instructions (e.g., software code) in the memory 48 of the controller 40.

The fuel fill control method 62 may begin at block 64. At block 66, the controller 40 may determine whether the first input signal 42 has been received from the GPS 34 indicating that a potential fuel station has been identified. If yes, the fuel fill control method 62 may proceed to block 68 and the controller 40 may determine whether the vehicle 10 is currently within a predefined distance from the potential fuel station identified at block 66. The predefined distance may be pre-programmed as any distance but is generally a small enough distance to indicate that a refueling event is likely forthcoming.

When both of blocks 66 and 68 return YES flags, the controller 40 may next determine whether the second input second 44 has been received from the sensor system 36 at block 70. The second input signal 44 may indicate that the shift device 35 has been moved to the park (P) position (i.e., the vehicle is in park). If YES, the controller 40 may automatically command the fuel tank depressurization sequence to begin at block 72. The fuel tank depressurization sequence may involve either decreasing or increasing the pressure of the fuel tank 20 to be within a predefined pressure range. The fuel door 16 may be held in the locked position by the actuator 54 during the fuel tank depressurization sequence.

After the fuel tank depressurization sequence has completed (typically 3-15 seconds long), the fuel door 16 may be unlocked at block 74. The fuel door 16 may be unlocked by moving the piston 58 out of the detent 60, for example. The user may then open the fuel door 16 at block 76 and begin refueling at block 78. The user will not have to wait to refuel because the fuel tank depressurization sequence has been initiated earlier than traditional refueling processes that require the user to depress a fuel door opening button to being the depressurization sequence.

Figure 6:
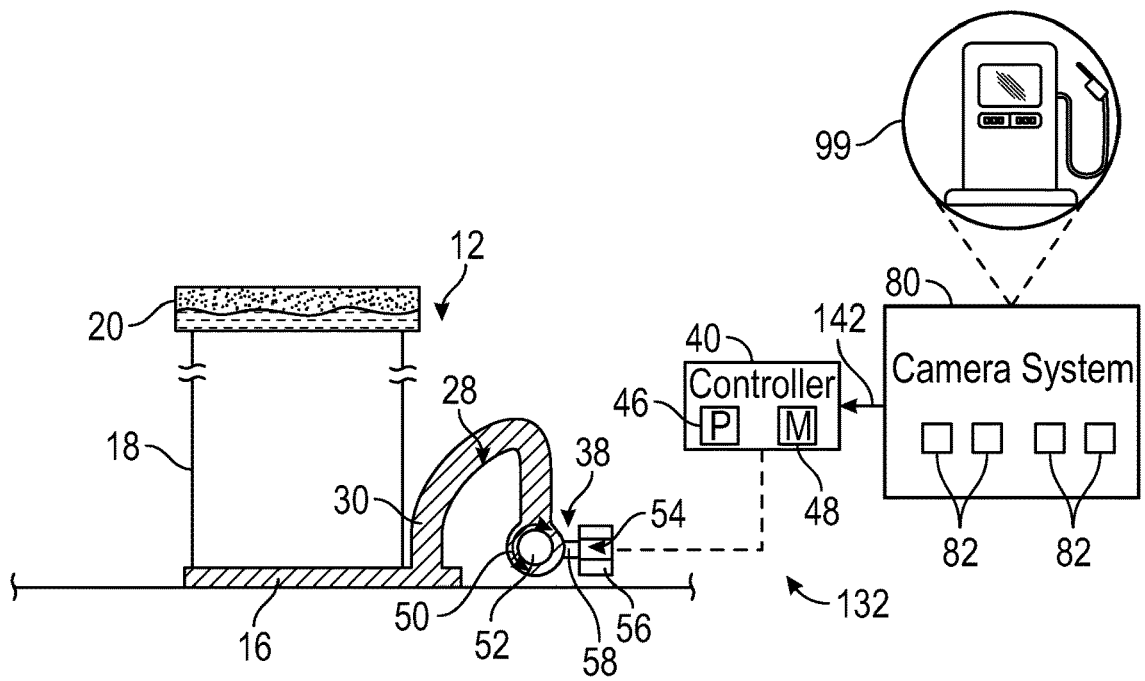
FIG. 6 illustrates a fuel fill control system according to another embodiment of this disclosure.

FIG. 6 illustrates another exemplary fuel fill control system 132.

Like the fuel fill control system 32, the fuel fill control system 132 may be employed to initiate the fuel tank depressurization sequence of the fuel system 12 without requiring any specific prompt from the user, thereby reducing user wait times for gaining access to the inlet opening 22 of the fuel inlet conduit 18 for refueling.

The fuel fill control system 132 may include a camera system 80, the door biasing assembly 38, and the controller 40. The camera system 80 may include one or more cameras 82. The cameras 82 are configured to capture images of the environment surrounding the vehicle 10. In an embodiment, the cameras 82 may be placed at various locations of the vehicle to provide a near 360 degree view of the surrounding environment.

In an embodiment, the camera system 80 is configured to anticipate a refueling event of the vehicle 10. For example, the cameras 82 of the camera system 80 may capture an image 99 of a fuel pump at a fuel station and then communicate a first input signal 142 to the controller 40. The first input signal 142 indicates that the vehicle 10 is very likely parked next to a fuel pump at a fuel station and thus a refueling event is likely.

The camera system 80 may be in electrical communication with the controller 40 for determining when to initialize a fuel tank depressurization sequence. A first exemplary program of the controller 40, when executed, may be employed to automatically initiate the fuel tank depressurization sequence in response to receiving the first input signal 142 from the camera system 80. The first input signal 142 therefore provides an input to the controller 40 for inferring or anticipating that the user desires to refuel the vehicle 10. Anticipating the refueling event in this manner can reduce user refueling wait times and eliminate the need for setting a check engine light error in situations where the user inadvertently leaves the fuel door 16 open after refueling.

A second exemplary program of the controller 40, when executed, may be employed to hold the fuel door 16 closed during the fuel tank depressurization sequence. For example, in response to receiving the first input signal 142, which indicates that a refueling event is likely, the controller 40 may command the actuator 54 of the door biasing assembly 38 to the first position Y (see FIG. 4A), thereby locking the positioning of the fuel door 16 during the fuel tank depressurization sequence.

A third exemplary program of the controller 40, when executed, may be employed to unlock the fuel door 16 after bringing the pressure of the fuel tank 20 within a predefined pressure range. For example, the controller 40 may command the actuator 54 to the second position Y' (see FIG. 4B) once the pressure of the fuel tank 20 is within the predefined pressure range, thereby allowing the user to open the fuel door 16 and begin refueling.

Figure 7:
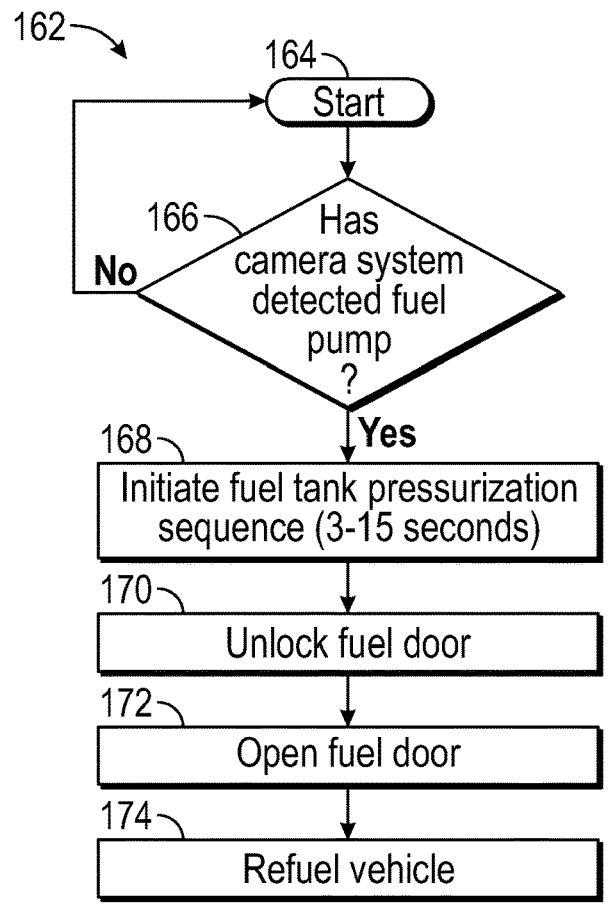
FIG. 7 schematically illustrates another exemplary fuel fill control method.

FIG. 7, with continued reference to FIG. 6, schematically illustrates another exemplary fuel fill control method 162. The fuel fill control method 162 may be a control strategy that is executed in order to anticipate a likely refueling event of the vehicle 10 and respond thereto by initiating the fuel tank depressurization sequence. For example, the fuel fill control method 162 may be performed by the fuel fill control system 132 in order to initiate the fuel tank depressurization sequence of the fuel system 12 without requiring any specific prompt from the user, thereby reducing user wait times for gaining access to the inlet opening 22 of the fuel inlet conduit 18 for refueling.

In an embodiment, the controller 40 of the fuel fill control system 132 is programmed with one or more algorithms adapted to execute the exemplary fuel fill control method 162. In another embodiment, the fuel fill control method 162 is stored as executable instructions in the memory 48 of the controller 40.

The fuel fill control method 162 may begin at block 164. At block 166, the controller 40 may determine whether the first input signal 142 has been received from the camera system 80, thus indicating that an image of a fuel pump of a fuel station has been captured and that a refueling event is likely. If YES, the fuel fill control method 162 may proceed to block 168 at which time the controller 40 may command the fuel tank depressurization sequence to begin. The fuel door 16 may be held in the locked position by the actuator 54 during the fuel tank depressurization sequence.

Next, after the fuel tank depressurization sequence has completed (typically 3-15 seconds), the fuel door 16 may be unlocked at block 170. The fuel door 16 may be unlocked by moving the piston 58 out of the detent 60, for example.

The user may then open the fuel door 16 at block 172 and begin refueling at block 174. The user will not have to wait to refuel because the fuel tank depressurization sequence has been initiated earlier as compared to traditional refueling processes by inferring a likely refueling event.

Figure 8:
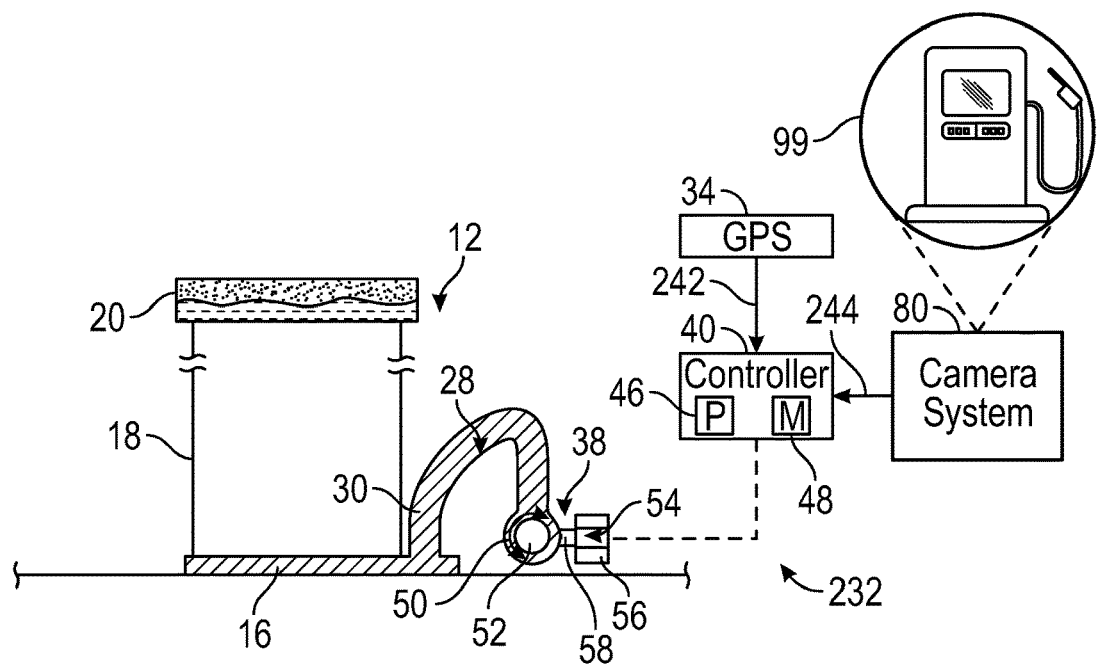
FIG. 8 illustrates a fuel fill control system according to yet another embodiment of this disclosure.

FIG. 8 illustrates yet another exemplary fuel fill control system 232. In this embodiment, the fuel fill control system 232 may include both the GPS 34 and the camera system 80 for anticipating refueling events. Although not shown in this embodiment, the fuel fill control system 232 could optionally include the sensor system 36 of FIG. 3 for detecting when the vehicle 10 is in park.

The GPS 34 may identify fuel stations that are located nearby the vehicle 10. The GPS 34 may periodically communicate a first input signal 242 to the controller 40, such as when the vehicle 10 is within a predefined distance from a known and identified fuel station, for example.

The camera system 80 may capture an image 99 of a fuel pump of a fuel station and then communicate a second input signal 244 to the controller 40. The second input signal 242 indicates that the vehicle 10 is very likely parked next to a fuel pump at a fuel station, thereby indicating that a refueling event is highly likely.

The GPS 34 and the camera system 80 may be in electrical communication with the controller 40 for determining when to initialize a fuel tank depressurization sequence. An exemplary program of the controller 40, when executed, may be employed to automatically initiate the fuel tank depressurization sequence in response to receiving the first and second input signals 242, 244. The first and second input signals 242, 244 therefore provide inputs to the controller 40 for inferring or anticipating that the user desires to refuel the vehicle 10. Anticipating the refueling event in this manner can reduce user refueling wait times and eliminate the need for setting a check engine light error in situations where the user inadvertently leaves the fuel door 16 open after refueling. The controller 40 may also be programmed to control when to lock and unlock the fuel door 16 via the actuator 54.

Figure 9:
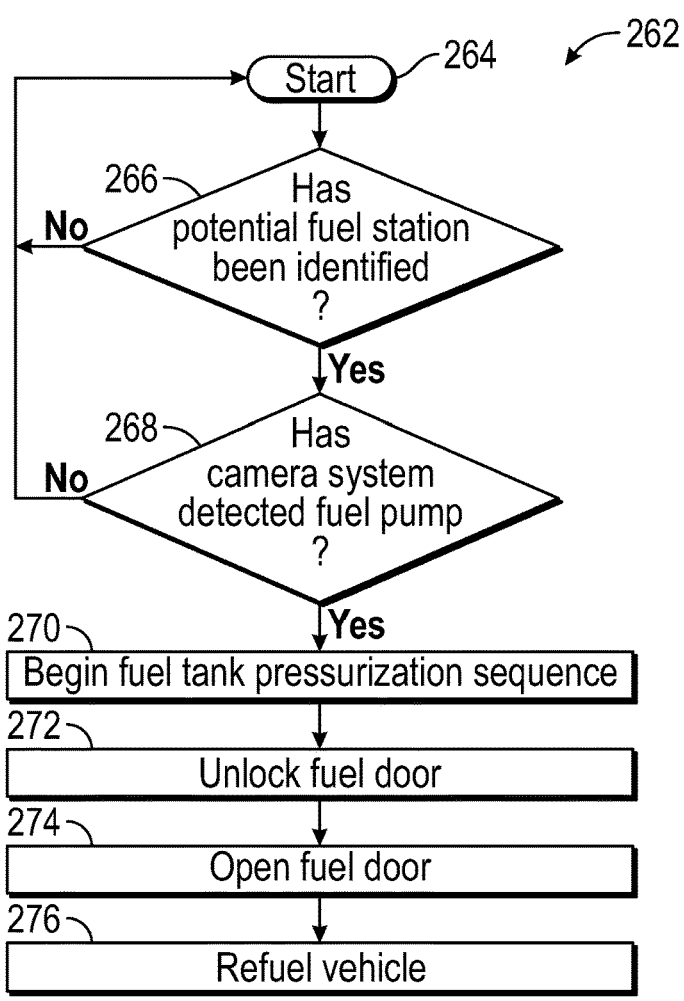
FIG. 9 schematically illustrates yet another exemplary fuel fill control method.

FIG. 9 schematically illustrates another exemplary fuel fill control method 262. The fuel fill control method 262 may be a control strategy that is executed in order to anticipate and respond to a likely refueling event of the vehicle 10. For example, the fuel fill control method 262 may be performed by the fuel fill control system 232 in order to initiate the fuel tank depressurization sequence of the fuel system 12 without requiring the user to press a fuel door opening button, for example, thereby reducing user wait times for gaining access to the inlet opening 22 of the fuel inlet conduit 18 for refueling.

In an embodiment, the controller 40 of the fuel fill control system 232 is programmed with one or more algorithms adapted to execute the exemplary fuel fill control method 262. In another embodiment, the fuel fill control method 262 is stored as executable instructions in the memory 48 of the controller 40.

The fuel fill control method 262 may begin at block 264. At block 266, the controller 40 may determine whether the first input signal 242 has been received from the GPS 34, thus indicating that a potential fuel station has been identified. If YES, the fuel fill control method 62 may proceed to block 268 at which time the controller 40 may determine whether the second input signal 244 has been received from the camera system 80, thus indicating that an image of a fuel pump of a fuel station has been captured and that a refueling event is likely.

If blocks 266 and 268 both return YES flags, the fuel fill control method 262 may proceed to block 270 at which time the controller 40 may command the fuel tank depressurization sequence to begin. The fuel door 16 may be held in the locked position by the actuator 54 during the fuel tank depressurization sequence.

Next, after the fuel tank depressurization sequence has completed (typically 3-15 seconds), the fuel door 16 may be unlocked at block 272. The fuel door 16 may be unlocked by moving the piston 58 out of the detent 60, for example. The user may then open the fuel door 16 at block 274 and begin refueling at block 276. The user will not have to wait to refuel because the fuel tank depressurization sequence has been initiated earlier as compared to traditional refueling processes by anticipating a likely refueling event.

The fuel fill control systems and associated methods of this disclosure are configured to anticipate refueling events using GPS and/or cameras. Among other potential benefits, the exemplary systems and methods simplify and improve the vehicle refueling process, shorten fueling delays, eliminate the need for check engine light errors, and reduce the potential for exposure to fuel vapors.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A fuel fill control system for a vehicle, comprising:
   a fuel tank;
   a camera system configured to capture an image of a fuel pump of a fuel station; and
   a controller configured to initialize a depressurization sequence of the fuel tank in response to receiving a first input signal from the camera system,
   wherein the first input signal indicates that a vehicle refueling event is likely.

2. The fuel fill control system as recited in claim 1, wherein the first input signal indicates that the camera system has detected the fuel pump by capturing the image.

3. The fuel fill control system as recited in claim 1, wherein the camera system includes a plurality of cameras that are adapted to capture a near 360 degree view of an environment surrounding the vehicle.

4. The fuel fill control system as recited in claim 1, comprising a global positioning system configured to identify the fuel station.

5. The fuel fill control system as recited in claim 4, wherein the controller is configured to command the depressurization sequence of the fuel tank to begin in response to receiving the first input signal from the camera system and a second input signal from the global positioning system.

6. The fuel fill control system as recited in claim 5, wherein the second input signal indicates that the vehicle is within a predefined distance from the fuel station.

7. The fuel fill control system as recited in claim 1, comprising a fuel door movable to fluidly access the fuel tank, and a door biasing assembly configured to control movement of the fuel door.

8. The fuel fill control system as recited in claim 7, wherein the door biasing assembly includes an actuator configured to hold the fuel door closed during the depressurization sequence of the fuel tank.

9. The fuel fill control system as recited in claim 8, wherein the actuator is a solenoid.

10. The fuel fill control system as recited in claim 1, wherein the fuel fill control system is part of a Non-Integrated Refueling Canister Only System (NIRCOS) of the vehicle.

11. A fuel fill control system for a vehicle, comprising:
a fuel tank;
a global positioning system configured to identify a nearby fuel station;
a camera system configured to capture an image of a fuel pump of the nearby fuel station; and
a controller configured to initialize a depressurization sequence of the fuel tank in response to receiving a first input signal from the global positioning system and a second input signal from the camera system, wherein the first input signal and the second input signal indicate that a vehicle refueling event is likely.

12. The fuel fill control system as recited in claim 11, wherein the first input signal indicates that the camera system has detected the fuel pump by capturing the image.

13. The fuel fill control system as recited in claim 12, wherein the second input signal indicates that the vehicle is within a predefined distance from the fuel station.

14. The fuel fill control system as recited in claim 11, wherein the fuel fill control system is part of a Non-Integrated Refueling Canister Only System (NIRCOS) of the vehicle.

15. The fuel fill control system as recited in claim 11, wherein the controller is configured to initialize the depressurization sequence without requiring a prompt from a user of the vehicle.

16. The fuel fill control system as recited in claim 11, wherein the controller is further configured to command a door biasing assembly to hold a fuel door closed during the depressurization sequence.

17. The fuel fill control system as recited in claim 16, wherein the controller is further configured to command the door biasing assembly to unlock the fuel door after completing the depressurization sequence.

* * * * *